United States Patent Office 3,478,031
Patented Nov. 11, 1969

3,478,031
FURO[2,3-h]THIACHROMINE
Akira Takamizawa, Ibaraki-shi, Japan, assignor to Shionogi & Co., Ltd., Osaka, Japan
No Drawing. Filed May 1, 1967, Ser. No. 634,869
Claims priority, application Japan, May 7, 1966, 41/28,968
Int. Cl. C07d 99/10; A61k 27/00
U.S. Cl. 260—256.5   1 Claim

ABSTRACT OF THE DISCLOSURE dl - 6a,9a - cis - 2,6a - dimethyl - 6a,8,9,9a,10a,11 - hexahydro-5H-furo[2,3-h]thiachromine having vitamin $B_1$, lipid shifting, antipyretic and anti-inflammatory activities, and a method for its production which comprises neutralizing a thiamine salt or a thiol-type thiamine salt.

---

This invention relates to a furo[2,3-h]thiachromine derivative. More particularly, it relates to dl-6a,9a-cis-2,6a - dimethyl - 6a,8,9,9a,10a,11 - hexahydro - 5H - furo [2,3-h]thiachromine. It relates further to a process for production thereof.

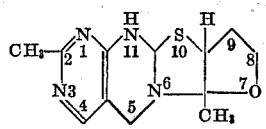

Hitherto, there has never been known such a unique type compound as illustrated above. In the course of investigations on thiamine compounds, it was discovered by the present inventor that the 2 position of the thiazole ring of thiamine shows a particular activity against an active hydrogen-containing group such as an amino group under a neutralized condition. Accordingly, when the neutralized thiamine is kept at pH 7 to 8 for a time, an interaction of the active 2 position with the primary amino group of the pyrimidine nucleus takes place to afford the above illustrated furo[2,3-h]thiachromine derivative. And, the inventor discovered also that the product obtained by this new intramolecular reaction is useful as a medicament or as an intermediate for the synthesis of medicaments. The present invention has founded on the bases of these discoveries.

Accordingly, an object of the present invention is to provide a novel furo[2,3-h]thiachromine derivative. Another object of the invention is to provide a furo[2,3-h] thiachromine derivative showing vitamine $B_1$, lipid shifting, antipyretic and anti-inflammatory activities. A further object of the present invention is to provide a process for the production of a furo[2,3-h]thiachromine derivative. These and other objects and the manner in which they are accomplished will become apparent to those conversant with the art from the following description.

According to the present invention, the objective compound, dl - 6a,9a - cis - 2,6a - dimethyl - 6a,8,9,9a,10a,11-hexahydro-5H-furo[2,3-h]thiachromine, can be produced by neutralizing a thiamine salt or a thiol type thiamine salt with a neutralizing agent in an inert solvent until the mixture is adjusted to a pH ranging from 7 to 8 and allowing the resulting mixture to stand at a temperature from 0° C. to a reflux temperature of the solvent, preferably at 20 to 50° C.

The starting material of the process of the invention is a thiamine salt or a thiol-type thiamine salt, As the thiamine salt, there may be exemplified thiamine chloride, thiamine bromide, thiamine nitrate, thiamine phosphate, thiamine thiocyanate, thiamine sulfate, thiamine chloride hydrochloride, thiamine bromide hydrochloride, thiamine iodide hydrochloride and the like. As illustrative of the thiol-type thiamine salt are S-sodium salt of thiol-type thiamine, S-potassium salt of thiol-type thiamine, S-calcium salt of thiol-type thiamine, S-zinc salt of thiol-type thiamine and the like. When a thiamine salt is employed as the starting material, the neutralization agent should be a base. Likewise, when a thioltype thiamine salt is taken up, an acid should be used as the neutralization agent. Generally speaking, a mild neutralization agent, i.e. a weak acid such as carbon dioxide, an N-halogenomethylene-dimethylammonium halogenide or the like or a weak base such as a dialkyl amine, a trialkylamine, a pyridine base or the like, is preferred, because an exceeding neutralization results in the formation of another salt, i.e. the formation of a thiol-type thiamine salt from a thiamine salt or that of a thiamine salt from a thiol-type thiamine salt. The reaction is usually carried out in a suitable inert solvent such as a lower alkanol (e.g. methanol, ethanol, propanol), a lower aliphatic ketone (e.g. acetone, methylethylketone), a lower halogenoalkane (e.g. chloroform, carbon tetrachloride, trichloroethane), an ether (e.g. diethyl ether, tetrahydrofuran, dioxane, diglyme), dimethylformamide, dimethylsulfoxide, benzene and the like. When a liquid neutralizing agent is employed, it may be possible to carry out the reaction without such a reaction solvent as exemplified, because the liquid neutralizing agent can be available not only as the reagent but also as the reaction solvent.

The reaction can be executed by neutralizing the starting salt until the reaction medium is adjusted to a pH ranging from 7 to 8 and allowing the mixture to stand for 0.5 to 50 hours, usually for 1 to 20 hours, at a temperature from 0° C. to a reflux temperature of the solvent, preferably at from 20 to 50° C.

When the starting compound, i.e. a thiamine salt or a thiol-type thiamine salt, is neutralized, it is considered, there is intermidiarily produced a neutralized thiamine being a resonace hybrid between the yield form (A) and the carbene form (B):

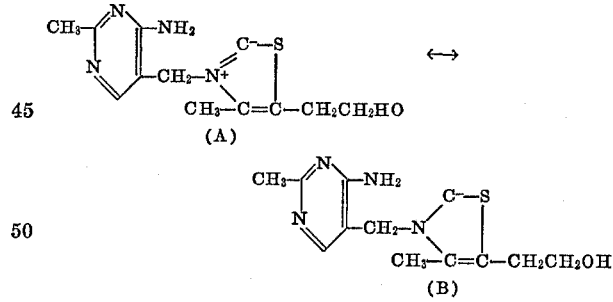

and the reaction of the 2 position of the thiazole ring with the primary amino group and the addition of the hydroxyl group to the double bond of the thiazole ring take place subsequently to afford the objective furo[2,3-h]thiachromine derivative. As well known, the neutralized thiamine is also in the state of an equilibrium between the thiazole-type and the thiol-type, especially in an aqueous medium, and the thiol-type compound is not so reactive that the yield of the objective compound is apparently decreased. Accordingly, the reaction of the present invention is preferably carried out in a non-aqueous solvent as exampli- fied previously.

The thus produced furo[2,3-h]thiachromine derivative shows vitamin $B_1$ and lipid shifting activities. Moreover, it has also mild antipyretic and anti-inflammatory activities. The product is useful as a vitamin $B_1$ agent being characterized in its stability at the neutral or basic pH, contrary to that vitamin $B_1$ is stable at the acidic pH. The compound is also useful as a lipid shifting agent, more particularly as a lipolytic agent. Furthermore, the median lethal dose value ($LD_{50}$) is determined to be 400 mg./kg. in mice subcutaneously. It can be administered in a variety of per se conventional ways, e.g. in the form of tablets constituted e.g. by an effective single dose of active compound of the present invention and a major proportion of a per se conventional carrier.

The following examples illustrate methods of carrying out the present invention, but it is to be understood that these examples are given for purpose of illustration only and not of limitation. In the examples which follow, parts by weight bear the same relation to parts by volume as grams do to millilitres. The temperatures are set forth in degree centigrade. The abbreviations have conventional significances.

EXAMPLE 1

In to a suspension of sodium salt of thiol-type thiamine (42.5 parts by weight) in dioxane (200 parts by volume) is passed cabon dioxide gas at 11° C. with stirring, until the mixture is adjusted to pH 7.5. The neutralization takes about 4 hours. Then, the mixture is allowed to stand at room temperature overnight, and the solvent is distilled off at 40 to 45° C. under reduced pressure. The residue is extracted with chloroform, the extract is washed three times with water, dried over anhydrous sodium sulfate and evaporated. The residue is crystallized from acetone and recrystallized from the same solvent to give $dl$-6a,9a-cis - 2,6a - dimethyl - 6a,8,9,9a,10a,11 - hexahydro - 5H-furo[2,3-h]thiachromine (18 parts by weight) as colorless pillars melting at 171 to 172° C.

IR, $\nu_{max.}^{Nujol}$ cm.$^{-1}$: 1622, 1583. UV, $\lambda_{max.}^{EtOH}$ m$\mu$: 245, 284. NMR, $\tau$ (in $CDCl_3$): 8.45 ($CH_3$, angular), 7.56 ($CH_3$), 2.70 (NH).

Analysis.—Calcd. for $C_{12}H_{16}N_4OS$: C, 54.55; H, 6.10; N, 21.20; S, 12.13. Found: C, 54.13; H, 5.93; N, 21.16; S, 12.56.

EXAMPLE 2

To a suspension of thiamine chloride (15 parts by weight) in methanol (200 parts by volume) is added morpholine (10 parts by weight) and the mixture is heated at 50° C. for 1.5 hours. Working up in the similar manner to the Example 1, there is obtained $dl$-6a,9a-cis-2,6a - dimethyl - 6a,8,9,9a,10a,11 - hexahydro - 5H - furo [2,3-h]thiachromine (8 parts by weight), which melts at 171 to 172° C.

What is claimed is:

1. $dl$ - 6a,9a - cis - 2,6a - dimethyl - 6a,8,9,9a,10a,11-hexahydro-5H-furo[2,3-h]thiachromine of the following formula:

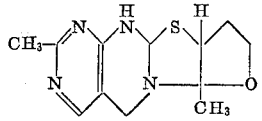

References Cited

UNITED STATES PATENTS 3,378,555   4/1968   Takamizawa et al. __ 260—256.5

OTHER REFERENCES

Hirano, Chem. Abstracts, 1955, vol. 49, col. 1730.

ALEX MAZEL, Primary Examiner

R. J. GALLAGHER, Assistant Examiner

U.S. Cl. X.R.

260—256.6; 424—251